March 4, 1969  H. G. YODER  3,431,028
BRAKE SYSTEM AND METHOD OF OPERATION
Filed Feb. 21, 1966
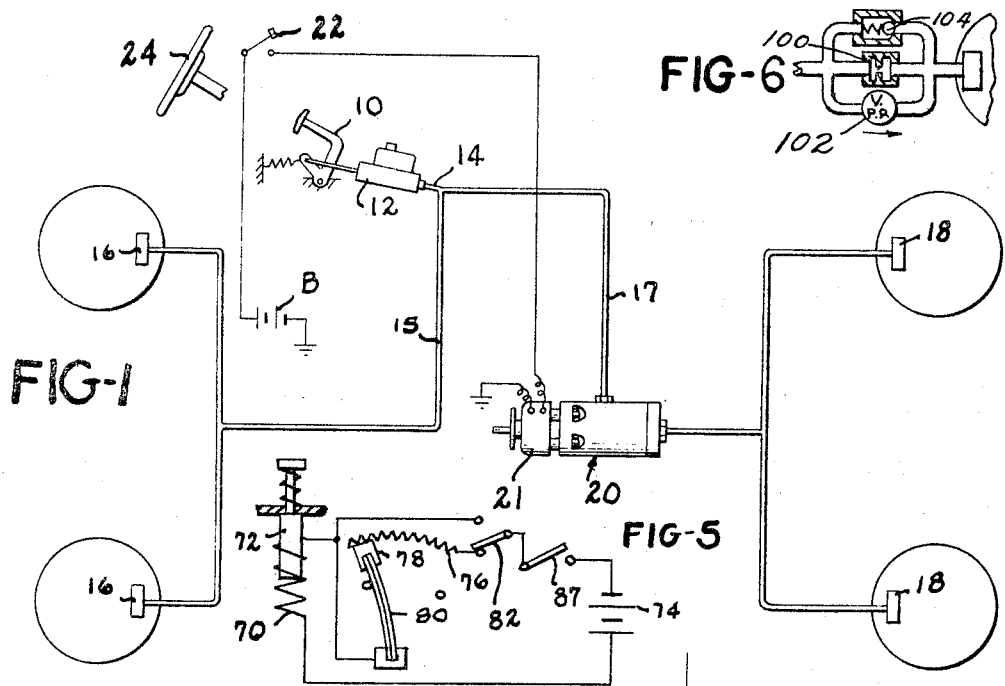
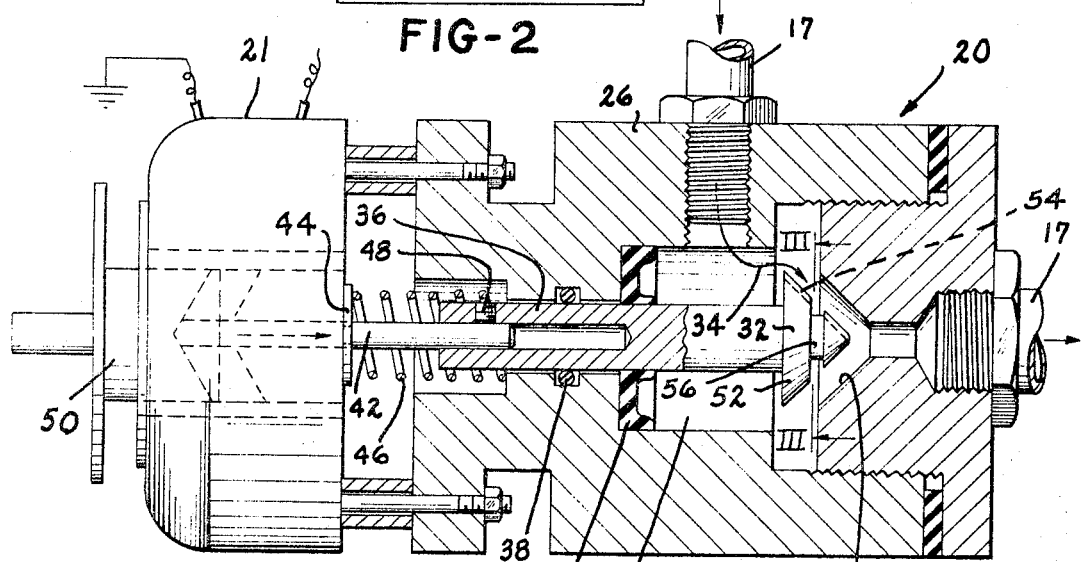
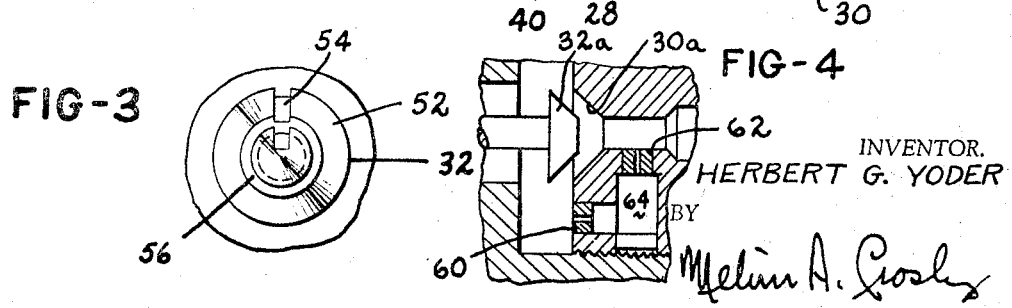
INVENTOR.
HERBERT G. YODER
BY
Melvin A. Crosley

United States Patent Office 3,431,028
Patented Mar. 4, 1969

3,431,028
BRAKE SYSTEM AND METHOD OF OPERATION
Herbert G. Yoder, R.R. 3, Bellefontaine, Ohio 43311
Filed Feb. 21, 1966, Ser. No. 532,518
U.S. Cl. 303—6                                    5 Claims
Int. Cl. B60t 13/46; F16k 31/04, 51/00

ABSTRACT OF THE DISCLOSURE

Brake system for front and back wheel brakes having a common source of pressure fluid for the actuation thereof in which a flow restrictor is serially connected between the source and the front brake actuators to delay the build-up of pressure in the front brake actuators together with means to make the restrictor selectively effective or ineffective.

This invention relates to vehicle power braking systems and is particularly concerned with a novel braking system and a method of braking for vehicles having brakes on both forwardly and rearwardly disposed wheels thereof.

With vehicles having brakes on forwardly disposed wheels as well as on rearwardly disposed wheels, it sometimes occurs, on account of street and road conditions, that braking must be accomplished at a time when the possibility exists of the vehicle skidding. This will occur particularly when the necessity for very quick braking arises and the road is slippery either from rain or snow or the like. A vehicle, under conditions of skidding, becomes somewhat difficult to control and I have discovered that the principal loss of control occurs at the forwardly disposed wheels. Thus, by reducing the tendency for these wheels to skid, I have found that the control of the vehicle under the aforementioned conditions can be considerably improved.

It is to be understood that the vehicle can be a trailer vehicle or an automotive vehicle such as the tractor for a trailer, a truck, or a passenger car. The term "power brakes" is intended to include hydraulically operated brakes, pneumatically operated brakes, whether pressure or suction, and electrically operated brakes.

With the foregoing in mind, the present invention has, as a primary object, the provision of a braking system and a method of operating the brakes for a vehicle having brakes on multiple wheels in which the tendency for the vehicle to skid is reduced.

Another object of this invention is the provision of a method and apparatus for braking a multiple wheel brake vehicle in which better control can be maintained over the vehicle in case there is any tendency for the vehicle to skid during braking.

Still another object of the invention is the provision of a relatively simple control device or mechanism that can be incorporated in existing, as well as in new, vehicles for the purpose of effecting a brake control as mentioned above.

A still further object of the present invention is the provision of an arrangement for delaying the build up of brake actuating force in the brake actuators of selected wheels of a power operated multiple wheel brake system for a vehicle so as to reduce the tendency for the selected wheels to lock and skid.

A still further object of the present invention is the provision of a method and apparatus for momentarily reducing the braking force exerted on selected wheels of a multiple wheel brake vehicle but which method and apparatus does not in any way detract from the ultimate braking force of the said selected wheels.

The foregoing objects as well as other objects and advantages of the present invention will become more apparent upon reference to the following detailed specification taken in connection with the accompanying drawings in which:

FIGURE 1 is a schematic representation of the braking system for a four wheel vehicle showing, by way of example, a control arrangement according to the present invention incorporated therein;

FIGURE 2 is an enlarged vertical sectional view through the control device of the brake system that is supplied thereto according to the present invention, and which in this case is a valve component;

FIGURE 3 is a transverse sectional view indicated by line III—III on FIGURE 2 showing a detail in connection with the valve component according to the present invention;

FIGURE 4 is a fragmentary view showing a modification of the valve of FIGURE 3;

FIGURE 5 is a schematic view showing the invention adapted to an electric braking system; and FIGURE 6 shows a modification.

According to the present invention, a vehicle having multiple wheel brakes that are actuated by power, such as fluid power, either pneumatic or hydraulic, or electrical power, is inhibited from skidding on occasions that the manner of applying the brakes might lead to such skidding. For example, on wet, or snow covered, or icy streets, and particularly in conditions of somewhat congested traffic, it might become necessary to apply the vehicle brakes suddenly and this could lead to skidding of the vehicle. Other occasions of this nature will suggest themselves.

Such skidding can lead to serious loss of control of the vehicle, especially when it is the front steerable wheels of a truck or passenger car or the like that skid. I have discovered that better control of such a vehicle can be had if the said front steerable wheels are prevented from locking up during a braking operation, and are thereby inhibited from skidding.

When the front, or forwardly disposed wheels are on a trailer, I have found that the trailer tends to follow the tractor without skidding sideways and, furthermore, stabilizes the back end of the tractor against side skid. Also, when the front wheels are prevented from skidding during a braking operation, the rear wheels tend to hold the back end of the trailer against skidding sideways.

In the practice of my invention, means are provided to control the supply of actuating energy to the forwardly disposed wheels of the vehicle so that the braking force at these wheels which corresponds to the force exerted on the brake pedal is attained only after a predetermined time delay of, say, from one to three or four seconds. The time delay introduced into the braking response of the forwardly disposed wheels of the vehicle prevents these wheels from locking up even under strong braking so that control of the vehicle is maintained and the rear end of the vehicle, even if the rearwardly disposed wheels do lock up and skid, tends to track behind the front end of the vehicle.

When the power supply is by way of a fluid medium such as a hydraulic or pneumatic fluid, the delay in the build up of braking force referred to is effected by a throttling arrangement such as a special valve component in the conduit leading to the wheels where the delay is to be effected. The throttling arrangement or valve is essentially a one-way device and restricts fluid flow only in the direction in which the fluid moves during braking while permitting free flow of the fluid in the other direction whereby no delay occurs in release of the brakes. The throttling arrangement or valve, furthermore, is selectively operable, as by electrical or mechanical means, so that the brake system can operate normally, or with the delay at the selected wheels, at the will of the operator.

When the power supply for the brakes is electrical, the same mode of operation prevails except that the time delay is created by delaying the build up of current in the brake actuating elements of the selected wheels.

I have found that by permitting the brake force at the selected wheels to rise gradually to the normal amount that would correspond to the degree of actuation of the brake pedal, the change in braking power of the selected wheels can be felt and any necessary adjustments in the degree of actuation of the brake pedal can be made to prevent the front wheels from locking up when the braking force thereon reaches a maximum.

Referring to the drawings somewhat more in detail, in FIGURE 1, 10 is a brake pedal and 12 is a master cylinder. Leading from the master cylinder is tubing 14 which comprises a branch tube 15 leading to the rear wheel brake cylinders 16, and also comprising a branch tube 17 leading to the front wheels brake cylinders 18.

Incorporated in branch tube 17 is a valve 20 according to the present invention. This valve comprises an actuating solenoid 21 which is connected in circuit with a switch 22 positioned adjacent steering wheel 24 of the vehicle so that switch 22 is located conveniently for actuation by the operator of the vehicle. Switch 22 and solenoid 21 are in circuit with a battery B so that, upon closing of switch 22, solenoid 21 will be energized whereas, upon releasing of switch 22, solenoid 21 will be de-energized.

The valve 20 is shown in section in FIGURE 2 where it will be seen to comprise a body 26 having a flow passage 28 extending therethrough and with the aforementioned branch tube 17 being connected to opposite ends of the said flow passage. The flow passage comprises a seat 30 adapted for being controlled by a valve member 32. Valve member 32 is normally spaced from seat 30 so that free flow of braking fluid can take place through the flow passage as indicated by arrow 34 in FIGURE 2.

The valve member 32 has a stem portion 36 sealed with respect to the flow passage as by O-ring 38 or sealing cup 40 or by both. The stem extends through the end of body 26 and is connected with reciprocable plunger 42 of solenoid 21. Plunger 42 has a snap ring 44 thereon that determines one position of the plunger and, therefore, of the valve member 32, and a spring 46 bears between the said snap ring and body 26 of the valve and urges the plunger 42 and valve member 32 leftwardly into the position shown in FIGURE 2. The connection between the valve member and the plunger is effected by means of set screw 48.

Plunger 42 is connected with armature 50 of the solenoid and, upon energization of the solenoid, the armature 50 is moved toward the right and this will cause the conical end 52 of the valve member 32 to engage seat 30 of the flow passage thereby to interrupt free flow of fluid through the flow passage.

One of the conical end part 52 of the valve member, and the seat 30 of the flow passage, is provided with an axially extending groove 54 so that when the valve member is seated on the seat, fluid flow past the seat can take place only at a reduced rate.

Thus, when the valve member is closed the flow of fluid through the flow passage is restricted and, if the valve member is closed on the seat at the time of applying brake pedal 10, the pressure build up in front wheel cylinders 18 will be delayed a predetermined time.

The period of time that this delay occupies might be from, say, one to three seconds and during which time the braked vehicle can be controlled because the front wheels do not tend to lock and skid. At the end of the predetermined time, the pressure in the front wheel brake cylinders at 18 will be substantially the same as the pressure existing elsewhere in the braking system so that no loss of maximum braking power occurs through the use of the device of the present invention.

I have found that the effectiveness of groove 54 is improved by providing the valve member or the valve seat with an annular groove 56 which is disposed between the ends of axial groove 54. Annular groove 56 appears to create a sort of turbulence chamber interposed between two orifices in the form of the opposite end position of groove 54 that assists in creating the aforemention restriction and time delay when the valve member is closed when brake pedal 10 is applied.

In operation, switch 22 is normally open and normal braking in the vehicle in all respects will obtain upon the application of brake pedal 10.

Upon encountering road or traffic conditions where the possibility exists that rapid braking may be necessary with possible skidding of the vehicle, the operator of the vehicle will close switch 22 and this will effect energization of solenoid 21 to close valve member 32 on seat 30. Thereafter, when braking of the vehicle occurs, the build up pressure of the front wheel brake cylinders will be delayed for a predetermined length of time, depending on the characteristics of grooves 54 and 56. Once the hazardous road conditions are left, switch 22 can be open and completely normal braking conditions will again be obtained.

As has been explained above, when the build up of pressure in the front wheel cylinders is delayed, the major part of the initial braking is done by the rear wheels which will tend to keep the vehicle moving in the direction determined by the front wheels.

It will be understood that the particularly flow obstructing device or valve illustrated is purely exemplary of the manner in which the present invention can be practiced and that other valve structures can be employed for this purpose. Furthermore, the valve illustrated is designed for one particular type of vehicle with a particular degree of restriction in the valve and that the valve can be modified to provide a greater or lesser degree of restriction to fluid flow and that, furthermore, the degree of restriction offered by the valve could be made adjustable if so desired to make the valve adaptable to a wider range of vehicles with a reduced number of valve designs. Such adjustment might take the form, for example, of a by-pass channel within the valve separate from that provided by grooves 54 and 56 and including an adjustable needle valve so that the particular degree of restriction offered to fluid flow by the valve when closed could be varied somewhat to meet particular conditions.

It will be noted that the pressure fluid from the master cylinder does not tend to lift the valve member from the seat during braking but, rather, tends to hold the valve member on the seat when the valve is closed and a braking operation is initiated.

However, since the force of the solenoid is fairly small, about three pounds, and is opposed by spring 46; and the pressure in the brake system is on the order of 100 p.s.i. or more, release of the brake pedal will be accompanied by immediate movement of valve member 32 away from seat 30, due to oil pressure thereon from the wheel cylinder, so that the brakes are released without delay.

The delay created by grooves 54 and 56 of FIG. 3 can be effected, as shown in FIG. 4, by locating the throttling channel in a different location. In FIG. 4, 60 and 62 are orifice plugs and an enlarged channel 64 leads therebetween with the assembly by-passing valve member 32a and its seat 30a which, as will be seen, have no grooves therein. The operation, and effect of the valve of FIG. 4 is the same as that of the valve of FIG. 3.

In either case the valve can be used in either hydraulic of pneumatic system with, of course, suitable sizing of the by-pass channel. For a pneumatic pressure system, the valve will restrict in the direction toward the wheel brake actuating device while for a vacuum or suction system, the valve would be reversed so as to restrict fluid flow away from the wheel brake actuating device.

In every instance, the valve acts in one direction only so the brakes will always release instantly when the brake pedal is released.

FIG. 5 shows how the invention can be practiced with that acts on armature 72 that is connected to the adjacent wheel brake. Battery 74 is in circuit with solenoid 70 and rheostat 76 and contact 78 carried on the upper end of bimetal strip 80, also in the circuit. A switch 87, when closed, closes the circuit to cause actuation of the brakes.

When switch 87 is first closed, bimetal strip 80 is in its FIG. 5 position so that rheostat 76 is fully effective for reducing the current to solenoid 70 so that it exerts a smaller force on armature 72.

As current flows in the circuit, bimetal 80 is heated and flexes so as to move contact 78 toward the right thereby to cut out some of rheostat 76 so that more current is supplied to solenoid 70 for exertion of a greater force on armature 72.

When bimetal 80 is fully flexed, rheostat 76 is cut out completely and the maximum current is supplied to solenoid 70 for the maximum force on armature 72 which, of course, produces maximum braking force.

A selector switch 82 is provided which can be adjusted into position to by-pass rheostat 76 for normal operation of the brakes or into position to include the rheostat in the circuit for operation of the brakes as above described.

In FIGURE 6 I show a system wherein restrictor 100 is continuously effective to slow down the rate of application of brakes connected thereto. Check valve 102 bypasses restrictor 100 and provides for immediate release of the brakes when they are deenergized. Relief valve 104 bypasses restrictor 100 and provides for unrestricted supply of energy to the brakes under emergency or panic conditions.

It is understood that I contemplate use of the invention for hydraulic brakes, air pressure operated brakes, vacuum brakes, and electrically operated brakes, namely, for any braking system in which a control element, such as a brake pedal, controls the energization of the brakes through an intervening medium other than mechanical.

The invention finds its greatest use in vehicles having four or more wheels but is also usable in motorcycles or three wheeled vehicles.

What is claimed is:

1. In a fluid operated vehicle braking system having front and back wheel brake actuator means and a source of fluid for said actuator means in the form of a master cylinder, hydraulic circuit means leading from said source to said actuator means and means to initiate a supply of fluid under pressure from said source to said actuator means to actuate said brakes, said circuit means including flow restricting valve means between said source and the actuator means for the front wheel brakes having a flow passage therethrough with a seat and a valve member in the passage moveable relative to said seat between effective and ineffective positions and operable when in effective position to engage said seat, bypass means in said valve bypassing said seat and operable to restrict the flow of fluid through said valve when said valve member is in its effective position, whereby the development of full pressure on the front wheel brake actuator means is delayed for a predetermined length of time following the initiation of the supply of fluid under pressure from said source of said actuator means, means for interrupting said supply of fluid under pressure to deenergize said actuator means and thereby release the brakes actuated thereby, means responsive to the pressure fluid in the front wheel brake actuator means for permitting the release of fluid therefrom upon interruption of said supply of fluid under pressure from said source whereby no delay occurs in respect of deenergization of said front wheel brake actuator means, spring means biasing said valve member toward ineffective position, an actuator connected to said valve means and operable when energized for moving said valve member from its ineffective position into its effective position, and control means connected in controlling relation to said actuator and selectively operable independently of the supply of fluid from said source to said brake actuator means for energizing said actuator.

2. In a fluid operated vehicle braking system having front and back wheel brake actuator means and a source of fluid for said actuator means in the form of a master cylinder, hydraulic circuit means leading from said source to said actuator means and means to initiate a supply of fluid under pressure from said source to said actuator means to actuate said brakes, said circuit means including flow restricting valve means between said source and the actuator means for the front wheel brakes having a flow passage therethrough with a seat and a valve member in the passage moveable relative to said seat between effective and ineffective positions and operable when in effective position to engage said seat, bypass means in said valve bypassing said seat and operable to restrict the flow of fluid through said valve when said valve member is in its effective position, whereby the development of full pressure on the front wheel brake actuator means is delayed for a predetermined length of time following the initiation of the supply of fluid under pressure from said source to said actuator means, means for interrupting said supply of fluid under pressure to deenergize said actuator means and thereby release the brakes actuated thereby, means responsive to the pressure fluid in the front wheel brake actuator means for permitting the release of fluid therefrom upon interruption of said supply of fluid under pressure from said source whereby no delay occurs in respect of deenergization of said front wheel brake actuator means, spring means biasing said valve member toward ineffective position, control means connected to said valve means and selectively operable for moving said valve member from its ineffective position into its effective position, said control means comprising a solenoid and an energizing circuit therefor and connected thereto and including a switch positioned adjacent the vehicle operator's position for selective actuation by the vehicle operator.

3. A braking system according to claim 2 in which said bypass comprises serially arranged orifices and a turbulence chamber therebetween.

4. A braking system according to claim 2 in which at least one of said seat and the seat engaging portion of the valve member comprises an axial groove and at least one thereof also comprises an annular groove between the ends of said axial groove, said axial groove forming said bypass and said annular groove forming a turbulence chamber.

5. A braking system according to claim 2 in which said valve is disposed with the valve member on the master cylinder side of said seat so as to be acted on by pressure from the master cylinder to urge it against said seat when the valve member is in effective position in engagement with said seat and the master cylinder is actuated, said valve member being moveable away from said seat by the pressure on the front wheel brake actuator means side thereof upon release of the pressure from the master cylinder.

References Cited
UNITED STATES PATENTS

| 3,304,130 | 2/1967 | Doerfler | 303—6 |
| 1,994,320 | 3/1935 | McLaughlin | 137—513.3 XR |
| 2,291,033 | 7/1942 | Goepfrich. | |
| 2,876,625 | 3/1959 | Schnell | 188—152 XR |

MILTON BUCHLER, *Primary Examiner.*

J. J. McLAUGHLIN, Jr., *Assistant Examiner.*

U.S. Cl. X.R.

137—513.5, 599; 188—152; 251—117, 129